(12) United States Patent
Herder

(10) Patent No.: US 8,614,997 B1
(45) Date of Patent: Dec. 24, 2013

(54) METHOD AND APPARATUS FOR WIRELESSLY ROUTING DATA USING DOPPLER INFORMATION

(75) Inventor: John C. Herder, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1030 days.

(21) Appl. No.: 12/570,892

(22) Filed: Sep. 30, 2009

(51) Int. Cl.
*H04W 4/00* (2009.01)
(52) U.S. Cl.
USPC .................................................. 370/338
(58) Field of Classification Search
USPC .................................................... 370/338
See application file for complete search history.

(56) References Cited

U.S. PATENT DOCUMENTS

| | | | | |
|---|---|---|---|---|
| 5,818,383 A * | 10/1998 | Stockburger et al. | ......... | 342/109 |
| 6,445,344 B1 * | 9/2002 | Wise et al. | ..................... | 342/458 |
| 6,727,851 B2 * | 4/2004 | Bass et al. | ..................... | 342/418 |
| 7,778,622 B2 * | 8/2010 | Su | .................................. | 455/338 |
| 7,782,256 B2 * | 8/2010 | Smith | .......................... | 342/453 |
| 2005/0090201 A1 * | 4/2005 | Lengies et al. | ............... | 455/41.2 |
| 2005/0113142 A1 * | 5/2005 | Felter | .......................... | 455/562.1 |

* cited by examiner

*Primary Examiner* — Asad Nawaz
*Assistant Examiner* — Saad A Waqas
(74) *Attorney, Agent, or Firm* — Donna P. Suchy; Daniel M. Barbieri

(57) ABSTRACT

A mobile ad hoc wireless network which utilizes Doppler data when deciding with which neighboring node to communicate. Using age of the Doppler data as well as the sign and the magnitude of the relative movement between nodes to make routing determinations.

2 Claims, 3 Drawing Sheets

METHOD AND APPARATUS FOR WIRELESSLY ROUTING DATA USING DOPPLER INFORMATION

BACKGROUND OF THE INVENTION

This invention relates to ad hoc mobile wireless networks with high speed mobile transmitters.

Several techniques and numerous equipment arrangements have been used in the past to route data messages on the battlefield from a source to a destination. Many protocols exist which rely on accumulating knowledge of neighboring nodes and in part judging the quality of those neighboring nodes to be used to relay messages to a destination. Often the signal strength of the neighboring nodes is used to choose with which node to communicate. In mobile networks, the transmitters may be moving in all directions and at varying speeds. It is often necessary to increase the sample rate of ones neighbors to determine which node is best to use. When fighter aircraft are used as transmitter platforms, the sample rates need to be significantly increased owing to the rapid changes that occur in routing path availability. Also, each data packet could theoretically be appended with an additional data packet which provides the speed and direction of travel of the node.

While these methods are well known in the art, they have the following drawbacks. The increased sampling rate increases the overhead used to operate the network which thereby reduces the available capacity to transmit user message data. Or in the alternative, a lower sampling rate can be used but then either the availability or the stability of the system is degraded. The appended data packet with speed and direction of node travel information would further burden the system with more "overhead" data which either reduces the message capacity of the system or otherwise causes the same adverse affects as overloading the system.

Consequently, there exists a need for improvement in wireless ad hoc networks with high velocity, mobile transmitters.

SUMMARY OF THE INVENTION

It is an object of the present invention to improve the stability and/or message capacity of mobile wireless ad hoc networks having high velocity, mobile transmitters.

More specifically, an object of the invention is to provide a system and method for improving the confidence level of a particular route chosen through a network.

It is a feature of the present invention to detect Doppler shift between a given source and each of the nodes with which it could potentially use to route a message.

It is another feature of the present invention to track historical Doppler shift information for various pairs of nodes and use the same to aid in routing data.

It is an advantage of the present invention to reduce the transmit rate of participant advertisement messages.

It is another advantage of the present invention to reduce the required update cycle time for building new routing tables or for selecting between two otherwise seemingly equal nodes for routing.

It is another advantage to reduce power consumption.

The present invention includes the above-described features and achieves the aforementioned objects and advantages.

Accordingly, the present invention comprises an ad hoc wireless network comprising:

A mobile ad hoc wireless network comprising:
a first mobile transmitter moving in a first direction at a first speed; configured for transmitting and receiving digital data;
a second mobile transmitter moving in a second direction at a second speed; configured for transmitting and receiving digital data;
a third mobile transmitter moving in a third direction at a third speed; configured for transmitting and receiving digital data;
said first mobile transmitter receiving a data packet from each of said second mobile transmitter and said third mobile transmitter and further configured for generating Doppler data representative of a Doppler shift in a carrier associated with each of said data packets;
means for making a comparison in Doppler data among said data packets and making a network routing determination based upon said comparison.

And in and alternate embodiment:

A method of routing messages in a high speed mobile ad hoc network comprising the steps of:
a. Determining a Doppler shift magnitude for each of a plurality of received signals from a plurality of different mobile transmitters;
b. Using results of said step of determining a Doppler shift magnitude to route messages in a network.

And in another embodiment:

A method of routing messages in a mobile ad hoc wireless network, comprising the steps of:
a. Receiving by a first node, a message from a plurality of neighbor nodes;
b. Storing Doppler metrics measured at said first node from carrier measurements of messages received from said plurality of neighbor nodes;
c. Creating a route suitability score from said Doppler metrics;
d. Creating a time to next needed update estimate based upon said Doppler metrics;
e. Applying said route suitability score as a weighted input into a routing decision; and
f. Changing a time to next route update based upon said time to next needed update estimate.

BRIEF DESCRIPTION OF THE DRAWINGS

In the following description of the drawings, in which like reference numerals are employed to indicate like parts in the various views.

DETAILED DESCRIPTION OF THE DRAWINGS

Figure 1:
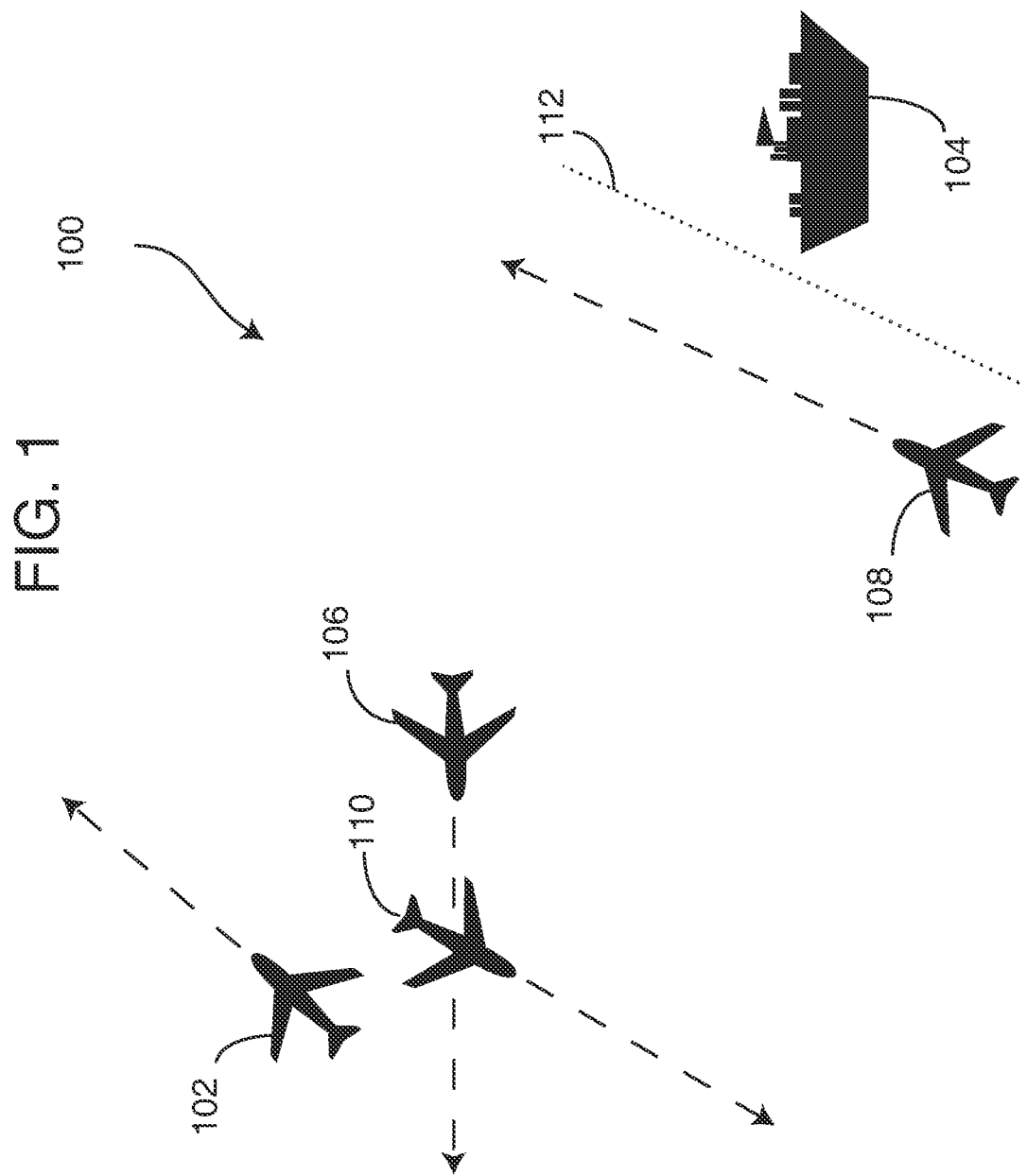
FIG. 1 is a birds eye view of a battlefield comprising various mobile platforms utilizing a network of the present invention, where the length of the dashed lines reflects the magnitude of a speed vector for the associated aircraft or vessel.

Referring now to the drawings, where like numerals refer to like matter throughout, attention is first directed to a system of the present invention as shown in the illustration of FIG. 1. FIG. 1 shows a battlefield generally designated 100 with an aircraft 102 with a dashed line velocity vector showing the magnitude and direction of the aircraft. Destination naval ship 104 is shown just beyond the line 112 representing the geographic limit of reliable communication from aircraft 102.

The system of the present invention would employ any one of or variations of several well known prior art waveforms or ad hoc routing systems such as Wideband Networking Waveform (WNW) or TTNT or the like,. The Doppler data of the present invention is not intended to be the sole information used to route messages around the network but to merely augment any other routing system.

In the present invention aircraft 102 would receive signals from each of first possible relay node aircraft 106, second possible relay node aircraft 108 and third possible relay node aircraft 110. The system in aircraft 102 would analyze each of these signals and determine a Doppler shift for each.

From a pure signal strength analysis only third possible relay node aircraft 110 might be the preferred node with which to communicate. First possible relay node aircraft 106 might be the second most preferred if based solely on signal strength. Second possible relay node aircraft 108 would likely be the least preferred if only signal strength were considered.

With the present invention aircraft 102 received packets that identify the packet transmitter are categorized by ID, time of reception, and associated Doppler shift. This information (hereafter Doppler data) may be held in a separate array or merged into a neighbor table of some type.

Sometime prior to transmitting a packet to a neighbor, node "N", which could be aircraft 102, must either make an independent routing decision or receive a routing decision from a network manager. To guide this decision, node "N" provides Doppler data to the routing function. The routing function assigns a quality metric to each Doppler data entry under consideration based on the data age and on the Doppler magnitude, and Doppler sign.

$$Q_d = f_{(data\_age, Doppler\_mag, Doppler\_sign)}$$

The routing decision function applies $Q_d$ to its candidate node list such that:
- older observations derate from the best available quality score (routing risk),
- positive sign, low Doppler_mag inputs result in a higher quality score (node approaching)
- positive sign, high Doppler_mag inputs result in a less high quality score (approaching quickly with risk of reception errors)
- negative sign, low Doppler_mag inputs result in a slightly reduced quality score (node departing)
- negative sign, high Doppler_mag inputs result in a lowest quality score (node departing quickly and risk of reception errors).

The function is determined a-priori, based on assessment of the dynamics of the participants. It could be uploaded to each participant based on known dynamics, such as via initialization or via a policy deployment.

An additional decision is also enabled by the Doppler data. Some networks run their routing decision functions on a periodic basis. The Doppler data can also be statistically evaluated to gauge the risk of routes breaking before the next period. Where the aggregate data shows low variance and low magnitude, the need for route updates is reduced. A network manager function can evaluate the data and thereby reduce the rate of updates transmitted to neighbors, thereby conserving both power and bandwidth. When the data shows high variance and high magnitude, the route update rate remains at a safe default value, or is increased to reduce incidence of route breakage.

With respect to FIG. 1, the node N, aircraft 102, depending upon the age of the Doppler data, might very well select second possible relay node aircraft 108 as the neighbor with which to communication, i.e. the least likely under a signal strength alone approach could be the best under the Doppler data approach. Clearly aircraft 102 and second possible relay node aircraft 108 could communicate for a longer period of time than any other node pair.

Figure 2:
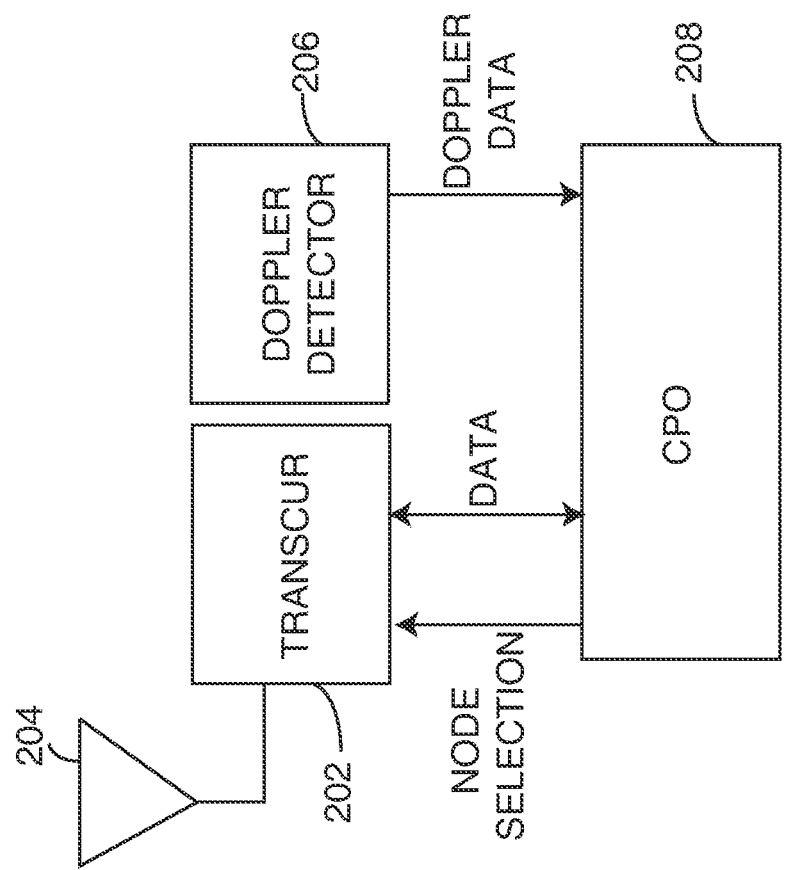
FIG. 2 is a simplified schematic diagram of a system of a typical node of the present invention.

Now referring to FIG. 2 there is shown a simple schematic of a typical mobile node of the present invention, which includes a transceiver 202, an antenna 204, a Doppler detector 206 and a CPU 208 for performing the Doppler based routing method of the present invention. It should be understood that the Doppler detector 206 could be its own processor and could include other components such as memory, data storage, I/O, and co-processor or other know computer components. A routing function can be performed by the Doppler Detector 206 the CPU 208 in conjunction with such other components. It should also be understood that the processing of information may be done in an integrated or distributed fashion.

Figure 3:
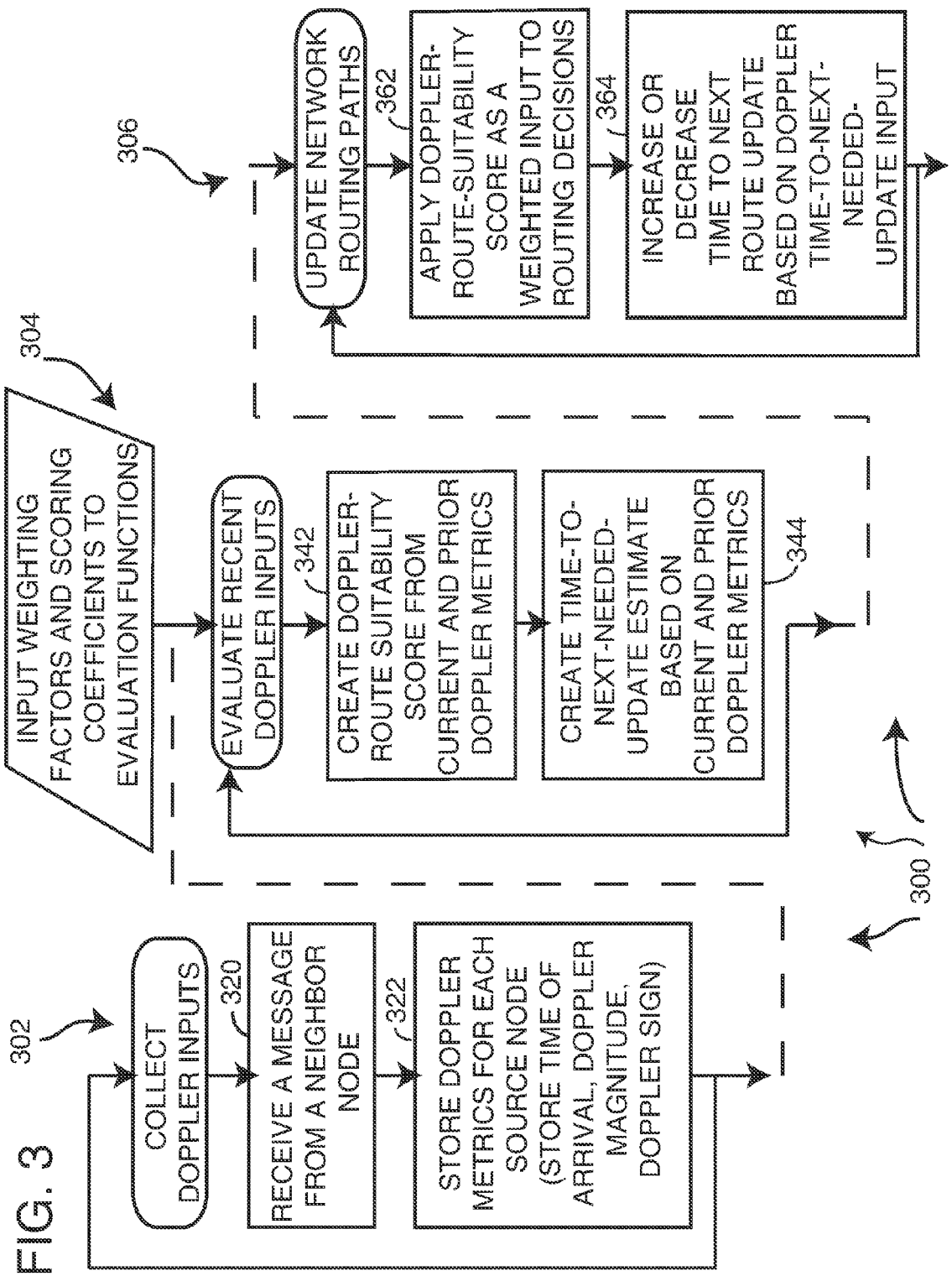
FIG. 3 is a flow chart of a representative portion of the Doppler augmented routing process of the present invention

Now referring to FIG. 3 there is shown a simplified flow diagram of the main new steps of the Doppler based routing method of the present invention. It is expected that an existing routing system, or a new variation of an existing routing system or methodology will be employed and the present invention is an augmented version of such routing schemes. The detailed hardware and software to run or alter a routing scheme are not shown or described as they are believed to be within ordinary skill in the art after reading and understanding the present invention.

There is shown a simplified augmentation to a message routing scheme, generally designated 300, which includes a first sequence 302 of collecting the Doppler inputs. This is accomplished when a message is received, as is done in prior art message routing schemes, from a neighboring node. The Doppler Metrics are collected and stored for each source node (Store time of arrival, Doppler Magnitude and Doppler Sign). The sequence is repeated with the Doppler Metrics being sent to the evaluation sequence 304. The scheme of the present invention with step 342 can create a Doppler-route-suitability score from the most current and historic Doppler metrics. Step 344 may involve creating a time to next needed update estimate based upon current and prior Doppler metrics. The updating routing plan sequence 306 may include the step of applying Doppler-route-suitability score as a weighted input to routing decisions. This may also result in step 346 which is increase or decrease time to next route update based on Doppler time to next needed update input. The augmentation of existing routing schemes with this Doppler data can provide many of the beneficial aspects of the present invention.

Note: a time-weighted average is one simple means of using any blend of current or past data to generate any appropriate input to the routing functions. More sophisticated methods, including statistical methods, may be employed depending on the dynamic nature of the nodes and the requirement of the overall system.

It is believed that when these teachings are combined with the known prior art by a person skilled in the art, many of the beneficial aspects and the precise approaches to achieve those benefits will become apparent.

It will be understood that certain features and sub-combinations are of utility and may be employed without reference to other features and sub-combinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

I claim:

1. A mobile ad hoc wireless network comprising:
a first mobile transmitter moving in a first direction at a first speed; configured for transmitting and receiving digital data;
a second mobile transmitter moving in a second direction at a second speed; configured for transmitting and receiving digital data;
a third mobile transmitter moving in a third direction at a third speed; configured for transmitting and receiving digital data;
said first mobile transmitter receiving a data packet from each of said second mobile transmitter and said third mobile transmitter and further configured for generating Doppler data representative of a Doppler shift in a carrier associated with each of said data packets;
wherein said Doppler data comprises:
time of arrival data at said first mobile transmitter and Doppler sign data, which is representative of the relative direction of travel between the first mobile transmitter and one of said second mobile transmitter, said third mobile transmitter;
Doppler magnitude which represents the rate of change of separation between the first mobile transmitter and one of said second mobile transmitter, third mobile transmitter; and
age of the Doppler shift magnitude data for said digital data received from said first mobile transmitter, said second mobile transmitter and said third mobile transmitter;
means for making a determination as to which of said second mobile transmitter and said third mobile transmitter to communicate with depending upon said Doppler data;
wherein said means of making a determination further;
gathers and stores historic Doppler data;
creating a Doppler-route-suitability score;
applying the Doppler-route-suitability score as a weighted input to routing decisions;
creating a Doppler time-to-next needed update estimate based upon current and the historic Doppler data; and
changing a time to next route update metric based upon said Doppler time-to-next needed update estimate.

2. A method of routing messages in a high speed mobile ad hoc network comprising the steps of:
providing a first mobile transmitter and receiver;
measuring a signal strength, at said first mobile transmitter, for each of a plurality of received signals from a plurality of different mobile transmitters;
measuring a Doppler shift magnitude, at said first mobile transmitter, for each of said plurality of received signals from said plurality of different mobile transmitters;
using results of said step of measuring a Doppler shift magnitude to determine which of said plurality of different mobile transmitters to route a message to a network;
determining a Doppler sign for each of said plurality of received signals from said plurality of different mobile transmitters;
using a result of said step of determining a Doppler sign to route messages in a network;
determining an age of the Doppler shift magnitude data for each of said plurality of received signals from said plurality of different mobile transmitters;
using a result of said step of determining an age of the Doppler magnitude to route messages in a network;
creating a Doppler-route-suitability score;
applying the Doppler-route-suitability score as a weighted input to routing decisions;
determining historic Doppler data;
creating a Doppler time-to-next needed update estimate based upon current and the historic Doppler data; and
changing a time to next route update metric based upon said Doppler time-to-next needed update estimate.

* * * * *